(12) United States Patent
Mitsuoka et al.

(10) Patent No.: US 6,448,543 B1
(45) Date of Patent: Sep. 10, 2002

(54) NEAR FIELD OPTICAL HEAD AND REPRODUCTION METHOD

(75) Inventors: Yasuyuki Mitsuoka; Norio Chiba; Nobuyuki Kasama; Takashi Niwa; Kunio Nakajima; Kenji Kato; Manabu Oumi, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/462,438
(22) PCT Filed: May 7, 1999
(86) PCT No.: PCT/JP99/02394
§ 371 (c)(1),
(2), (4) Date: Jan. 2, 2002
(87) PCT Pub. No.: WO99/59147
PCT Pub. Date: Nov. 18, 1999

(30) Foreign Application Priority Data

May 11, 1998 (JP) ............................ 10-127570
Apr. 15, 1999 (JP) ............................ 11-108005

(51) Int. Cl.[7] ................................................. G02B 7/04
(52) U.S. Cl. ................................ 250/201.3; 250/201.5; 250/307; 369/44.26
(58) Field of Search .......................... 250/201.3, 201.5, 250/306, 307, 308, 462.1, 483.1; 369/44.11, 44.14, 44.26; 300/325–327, 59, 48

(56) References Cited

U.S. PATENT DOCUMENTS 6,028,835 A * 2/2000 Thomas ....................... 369/121

* cited by examiner

Primary Examiner—Que T. Le
(74) Attorney, Agent, or Firm—Adams & Wilks

(57) ABSTRACT

A near-field optical head which reproduces, with high S/N, information recorded with extreme density and is compact in structure. On an electrode (2) is formed a recording medium (3) that emits a light by applying an electric field. Brought into proximity to a recording medium (3) is a near-field optical head (101) having a slider (31) formed with an inverted cone formed hole such that an apex thereof is rendered as a microscopic aperture (6). A microscopic electrode (5) is formed on a side surface (32) of the inverted cone formed hole. An electric field (9) is applied only to a microscopic region to cause light emission. It is possible at the aperture (6) to detect a light emitted only by the microscopic region.

7 Claims, 3 Drawing Sheets

NEAR FIELD OPTICAL HEAD AND REPRODUCTION METHOD

TECHNICAL FIELD

The present invention relates to information reproducing apparatuses for reproducing information of a recording medium having records with extreme density and, more particularly, to an information reproducing apparatus adapted for reproduction by a light in a near field.

BACKGROUND OF THE INVENTION

In many of the existing information reproducing devices, reproduction is implemented for the information recorded of an optical disk of an exclusive reproduction type represented by CDs and CD-ROMS. For example, the CD is recorded, as convex/concave information, with pits that has a size of nearly a wavelength of a laser light to be used upon reproduction and a depth of nearly a quarter of the wavelength. To reproduce the information, light interference phenomenon is utilized. When a laser light spot is illuminated onto a pit, there occurs due to the pit depth of a quarter wavelength a optical-path difference of a half wavelength of the illuminated laser light between a reflected light reflected upon a bottom surface of the pit and a reflected light reflected upon a surface outside the pit. The reflected light obtained however is weakened as compared to a case a laser light spot is illuminated on the surface outside the pit. In this manner, the presence and absence is determined due to detection of an intensity of a reflected light, thus achieving reproduction of information recorded on the optical disk.

The above reflected light detection system uses a lens optical system employed in the conventional optical microscope so that the laser light spot size cannot be reduced smaller than a half wavelength due to a diffraction limit of light. Consequently, where further increasing the information recording density on the optical disk, the size and truck pitch of pits are decreased to reduce the information recording unit down to a size smaller than a laser light wavelength. The conventional information reproducing apparatus cannot cope with information reproduction from such an optical disk.

Meanwhile, there is known a near-field optical microscope which uses a probe having a microscopic aperture with a diameter smaller than a wavelength of a laser light to be illuminated, say approximately one-tenth thereof, to utilize a near-field light (evanescent field) and thereby observe a microscopic surface structure of a sample. As one of near-field utilization schemes of the near-field optical microscopes, there is a method that a microscopic aperture of a probe and a sample surface are brought into proximity to a distance of nearly the microscopic aperture of a probe so that a transmission light can be illuminated from a sample backside to cause a near-field light on the sample surface to be observed by transmission through the probe. In this case, the near-field light caused in the sample surface involves an intensity and phase reflecting a fine structure on the sample surface. This near-field light is extracted as a propagating light through the microscopic aperture of a probe and then detected by a photo detector, thus achieving observation with a resolution unrealizable by the conventional optical microscopes.

Accordingly, by the utilization of the above near-field optical microscope technology, it is possible to reproduce even an information record unit recorded more microscopically than a recording density on the conventional information recording medium represented by the CD.

However, the near-field light generated by light illumination is very weak. Furthermore, because the probe is added therein with illumination light or stray light such as scattering light, it has been difficult to detect the presence or absence of a pit with sufficient intensity and preferred S/N ratio.

Also, in the case that the illumination light to an optical disk is intensified in order to cause an intensified near-field light, heated are not only a pit portion but also a probe tip positioned nearby the pit portion. There is a possibility that an optical disk or probe be damaged or deformed.

Therefore it is an object of the present invention to provide, in view of the above-stated problems, a near-field optical head for realizing with reliability information reproduction of an optical disk having records with extreme density.

DISCLOSURE OF THE INVENTION

In order to achieve the above object, a near-field optical head according to the present invention is a near-field optical head for reproducing information on a recording medium that is formed on an electrode and emits light by applying an electric field, the near-field optical head comprising; a slider having at least one hole formed through in an inverted cone form such that a summit thereof is rendered as a microscopic aperture and a head electrode opposed to the electrode and provided in the inverted cone formed hole; a light detecting element arranged in the slider on an opposite surface to a surface formed with the microscopic aperture in a manner corresponding to the microscopic aperture; the microscopic aperture and the recording medium being brought into proximity; and a voltage being applied to between the electrode and the head electrode.

Accordingly, the head electrode can apply an electric field only to a microscopic region of the recording medium, thereby causing light emission. Also, the emitted light is scattered by a microscopic aperture in proximity to the recording medium, and propagated to the light detecting element and thereafter received by the light detecting element, thereby receiving the light emitted only by the microscopic region of the recording medium. As a result, it is possible to provide a near-field optical head which can reproduce, with high S/N, information recorded with extreme density.

Also, a near-field optical head according to the invention is a near-field optical head for reproducing information on a recording medium that is formed on an electrode and emits light by applying an electric field, the near-field optical head comprising: a slider having at least one hole formed through in an inverted cone form such that a summit thereof is rendered as a microscopic aperture; a microscopic electrode formed on a side surface of the inverted cone formed hole; a light detecting element arranged in the slider on an opposite surface to a surface formed with the microscopic aperture in a manner corresponding to the microscopic aperture; the microscopic aperture and the recording medium being brought into proximity; and a voltage being applied to between the electrode and the microscopic electrode.

Accordingly, the microscopic electrode can apply an electric field only to a microscopic region of the recording medium, thereby-causing light emission. Also, the emitted light is scattered by a microscopic aperture in proximity to the recording medium, and propagated to the light detecting element and thereafter received by the light detecting element, thereby receiving the light emitted only by the microscopic region of the recording medium. As a result, it is possible to provide a near-field optical head which can reproduce, with high S/N, information recorded with extreme density.

Also, a near-field optical head according to the invention is a near-field optical head for reproducing information on a recording medium that is formed on an electrode and emits light by applying an electric field, the near-field optical head comprising: a slider having at least one hole formed through in an inverted cone form such that a summit thereof is rendered as a microscopic aperture; an optical waveguide formed on a side surface of the inverted cone formed hole; a tip sharpened electrode formed inside of the inverted cone formed hole and having a tip directed to the microscopic aperture; a light detecting element arranged in the slider on an opposite surface to a surface formed with the microscopic aperture in a manner corresponding to the optical waveguide; the microscopic aperture and the recording medium being brought into proximity; and a voltage being applied to between the electrode and the tip sharpened electrode.

Accordingly, the tip sharpened electrode can apply an electric field only to a microscopic region of the recording medium, thereby causing light emission. Also, the emitted light is scattered by a microscopic aperture in proximity to the recording medium, and propagated through the optical waveguide and thereafter received by the light detecting element, thereby receiving the light emitted only by the microscopic region of the recording medium. As a result, it is possible to provide a near-field optical head which can reproduce, with high S/N, information recorded with extreme density and is compact in structure.

Also, a near-field optical head is a near-field optical head for reproducing information on a recording medium that is formed on an electrode and emits light by applying an electric field, the near-field optical head comprising: a slider having at least one protrusion formed in an inverted cone form such that a summit thereof is opposed to the recording medium; a microscopic electrode formed on a side surface of the protrusion such that a microscopic aperture is formed at a tip; a light detecting element arranged in the slider on an opposite surface to a surface formed with the protrusion in a manner corresponding to the protrusion; the protrusion and the recording medium being brought into proximity; and a voltage being applied to between the electrode and the microscopic electrode.

Accordingly, the microscopic electrode can apply an electric field only to a microscopic region of the recording medium, thereby causing light emission. Also, the emitted light is scattered by a microscopic aperture in proximity to the recording medium, and received by the light detecting element, thereby receiving the light emitted only by the microscopic region of the recording medium. As a result, it is possible to provide a near-field optical head which can reproduce, with high S/N, information recorded with extreme density and is compact in structure.

Also, a near-field optical head according to the invention is a near-field optical head for reproducing information on a recording medium that is formed on an electrode and emits light by applying an electric field, the near-field optical head comprising: a slider having at least one protrusion formed in an inverted cone form such that a summit thereof is opposed to the recording medium; a microscopic electrode formed at a tip of the inverted cone form; a light detecting element arranged in the slider on an opposite surface to a surface formed with the protrusion in a manner corresponding to the protrusion; the protrusion and the recording medium being brought into proximity; and a voltage being applied to between the electrode and the microscopic electrode.

Accordingly, the microscopic electrode can apply an electric field only to a microscopic region of the recording medium, thereby causing light emission. As a result, it is possible to provide a near-field optical head which can reproduce, with high S/N, information recorded with extreme density and is compact in structure.

Also, a reproducing method according to the invention is a reproducing method for reproducing information on a recording medium that is formed on an electrode and emits light by applying an electric field, the reproducing method comprising: using a near-field optical head having a slider opposed to the electrode and formed with at least one tip sharpened head electrode, and a light detecting element arranged in the slider in a manner corresponding to the head electrode; bringing the protrusion and the recording medium into proximity; applying a voltage to between the electrode and the head electrode to cause the recording medium to emit light; and detecting a light due to light emission by the light detecting element.

Accordingly, the head electrode can apply an electric field only to a microscopic region of the recording medium, thereby causing light emission. As a result, it is possible to provide a near-field optical head which can reproduce, with high S/N, information recorded with extreme density.

Also, a reproducing method according to the invention is a reproducing method for reproducing information on a recording medium formed on an electrode and emits light by applying an electric field, the reproducing method comprising: using a near-field optical head having a slider formed with at least one microscopic aperture and having a head electrode opposed to the electrode and provided in the vicinity of the microscopic aperture, and a light detecting element arranged in the slider on a opposite surface to a surface formed with the microscopic aperture in a manner corresponding to the microscopic aperture; bringing the microscopic aperture and the recording medium into proximity; applying a voltage to between the electrode and the head electrode to cause the recording medium to emit light; and detecting a light due to light emission by the light detecting element through the microscopic aperture.

Accordingly, the head electrode can apply an electric field only to a microscopic region of the recording medium, thereby causing light emission. Also, the emitted light is scattered by a microscopic aperture in proximity to the recording medium, and propagated to the light detecting element and thereafter received by the light detecting element, thereby receiving the light emitted only by the microscopic region of the recording medium. As a result, it is possible to provide a near-field optical head which can reproduce, with high S/N, information recorded with extreme density.

BEST MODE FOR PRACTICING THE INVENTION

Embodiments of near-field optical heads according to the present invention will be concretely explained below with reference to the drawings. It should be noted that this invention is not limited to the embodiments.

[Embodiment 1]

Figure 1:
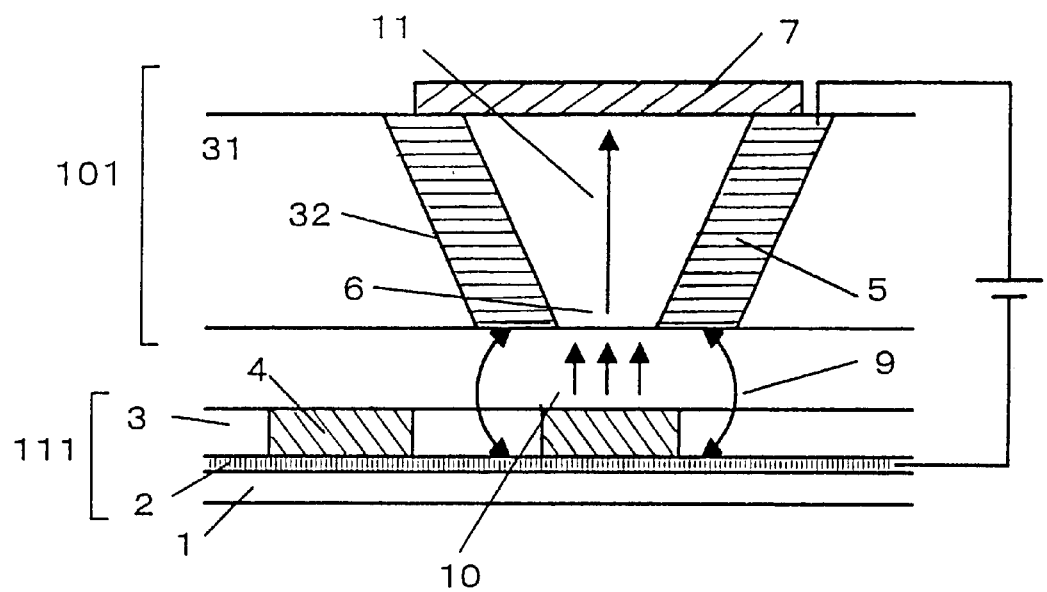
FIG. 1 is a sectional view of one part of a near-field optical head according to Embodiment 1 of the present invention.

FIG. 1 shows a sectional view of one part of a near-field optical head according to Embodiment 1. In FIG. 1, an optical disc 111 having information is formed with microscopic recorded marks 4 to cause luminescence upon application of an electric field. A microscopic aperture 6 formed in a near-field optical head 101 is brought into proximity to a surface of the optical head 111 so that a light detecting element 7 can receive a light emitted from the recorded mark 4, thereby reproducing information.

A silicon substrate 31 is formed through with a tapered portion 32 to have a microscopic aperture 6. This tapered portion 32 is formed with a microscopic electrode 5. The aperture 6 has a diameter, for example, of 50 nm. The tapered portion 32 is formed through microlithography using conventional photolithography or anisotropic etching. For example, a silicon substrate 31 with a (100) plane has a thermal oxide film or Au/Cr metal film at respective surfaces as a mask for anisotropic etching to be subsequently conducted. Its one surface is removed, at a portion to be formed as an aperture window of the mask, to thereby expose a (100) plane. Subsequently, the surface formed with the aperture window is exposed to an etchant, thereby forming a four-walled taper of a inverted pyramid structure in the silicon substrate 31. Simultaneously, a mask backside on the other surface is exposed to provide an tip for the aperture 6. Next, the mask material is removed from the both surfaces of the silicon substrate 31, thus obtaining a silicon substrate 31 formed with a tapered portion 32 with a desired aperture 6. Thereafter, a conductive metal film such as aluminum is formed on the tapered portion 32 by sputtering or evaporation, to form a microscopic electrode 5. Then, a light detecting element 7 is provided, through bonding or joining, on an opposite surface to the aperture 6 of the silicon substrate 31 in an area corresponding to the aperture 6.

The optical disk 111 is, for example, in a disk form to be rotated by a rotary mechanism (not shown), which has an electrode 2 such as ITO film on a substrate 1 such as glass and a recording medium 3 thereafter formed in a thin film form having electroluminescence (EL). The recording medium 3 can use an organic or inorganic EL thin film. As an organic EL thin film, for example an EL thin film can be used which is layered, by sputtering, with triphenildiamine (TPD) and tris (8-hydroxy-quinolinate) aluminum (Alq 3) each having a thickness of several tens of nm. In this case, by applying a low voltage of nearly several volts to the organic EL thin film, a visible light is emitted due to EL from an interface of TPD and Alq3. Usually, the organic EL thin film is more preferable than the inorganic EL thin film in respect of low application voltage required for luminescence.

The recording medium 3 is recorded with information as recorded marks 4 depending on the presence or absence of luminescence upon application by a predetermined electric field. A minimum recorded mark 4 has a diameter, for example, of 100 nm that is by far smaller than a spot diameter to be obtained by focusing a visible portion of light through a lens system. The recording information onto the recording medium 3 is possible, for example, by bringing a sharpened metal needle with a tip diameter nearly equivalent to the recorded mark size or smaller into proximity to or contact with the recording medium 3. A high voltage is applied to between the metal needle and the electrode 2 to cause an excessive current to flow through the recording medium 3, thereby erasing EL luminosity in a microscopic region on the recording medium 3. In the present embodiment, the area in which luminosity is remains left is referred to as a recorded mark 4. Its size will be almost the same as the tip diameter of the metal needle and hence made in 100 nm or smaller.

A voltage of nearly several volts is applied between the electrode of the optical disc 111 recorded with information and the microscopic electrode 5 of the near-field optical head 101 mentioned above, and the microscopic aperture 6 and the recording medium 3 are put into proximity to a distance of several tens of nm. A lubricant is provided between the near-field optical head 101 and the optical disk 111. If the near-field optical head 101 is formed sufficiently thin, then it is possible to maintain sufficient small the distance between the aperture 6 and the recording medium 3 by utilizing a surface tension of the lubricant. Moreover, deflection of the recording medium can be followed up.

Note that the near-field optical head 101 and the optical disc 111 may be controlled in state of proximity by an air bearing similarly to the flying head employed in the hard disk technology, instead of using a lubricant as above.

By thus putting the near-field optical head 101 and the optical disk 111 in proximity and applying voltage to between the microscopic electrode 5 and the electrode 2, an electric field 9 is applied to the recording medium 3. This electric field 9 has a magnitude that is dependent upon a distance between the microscopic electrode 5 and the electrode 2. However, the distance between the aperture 6 and the recording medium 3 is as short as several tens of nm. It is therefore possible to cause luminescence in the recording medium 3 using the organic EL thin film by merely applying a voltage of approximately several volts to between the microscopic electrode 5 and the electrode 2. Also, because the microscopic electrode 5 is formed only in the tapered portion 32 providing the microscopic aperture 6, the region of the recording medium 3 to be applied by an electric field 9 is as small as almost the aperture 6 size.

When the aperture 6 is positioned over a recorded mark 4, the recorded mark 4 is applied by the electric field 9, causing EL light 10. The electric field 9 is not applied to the recorded mark 4 distant from the aperture 6, causing no luminescence. Also, the other portions than the recorded marks 4 will not cause luminescence because of not possessing luminosity.

Because the distance between the aperture 6 and the recorded mark 4 is several tens of nm, EL light 10 is cause in a near-field region of the recorded mark 4. The EL light 10 is scattered upon the aperture 6 with a sufficient smaller diameter than the luminescent wavelength, and detected as a scattered light 11 by the light detecting element 7 and converted into an electric signal. Other lights such as propagation light and stray light than a reproduced light will not be detected by the light detecting element 7 because no need of causing a propagation light to produce a near-field light and further no EL light 10 is caused on other areas on the recording medium 3. The tapered portion 32 has the microscopic electrode 5 formed of metal such as aluminum, and has a high reflectivity so that the scattered light 11 can be efficiently illuminated to the light emitting element 7 with less loss. In this manner, it is possible for the near-field optical head 101 to reproduce with high S/N the information recorded with extreme density on the optical disc 111 with a minimum bit diameter, for example, of 100 nm or smaller.

Consequently, according to the near-field optical head according to Embodiment 1, the recording medium 3 for the optical disc 111 is made by the EL thin film and voltage is applied to between the microscopic electrode 5 and the electrode 2 whereby an electric field 9 can be applied only to the microscopic region. An EL light 10 caused only from a recorded mark 4 being applied by the electric field 9 is detected by the aperture. Thus, a reproduced signal is increased in S/N ratio, and further the information recorded with extreme density on the optical disc 111 is reproduced with reliability and stability.

The near-field optical head of the present embodiment incorporates therein a near-field detection system to detect a propagation light that is obtainable through interaction with a near-field light as generated in a conventional near-field optical microscope, eliminating adjustment relative to an aperture position. Furthermore, the present embodiment does not require a near-field creation system to generate a near-field by illumination with a propagation light. It is therefore possible to make compact the structure of an information reproducing apparatus using the present embodiment.

[Embodiment 2]

Figure 2:
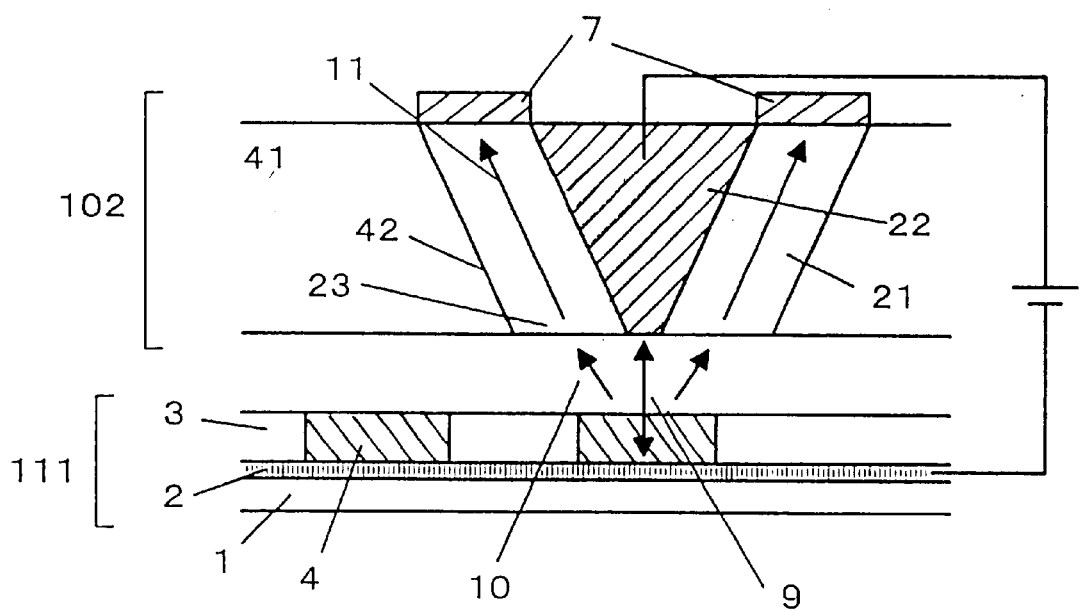
FIG. 2 is a sectional view of one part of a near-field optical head according to Embodiment 2 of the invention.

FIG. 2 shows a sectional view of one part of a near-field optical head according to Embodiment 2. Incidentally, the common elements to those of FIG. 1 are denoted at the same reference characters.

In FIG. 2, the optical disk 111 is the same in structure. The near-field optical head 102 is formed with a tip-sharpened electrode 22 which is brought proximity to a surface of the optical disk 111. The light emitted from a recorded mark 4 is guided through an optical waveguide 21 and received by a light detecting element 7. Thus, the information recorded on the optical disk 111 is reproduced.

A silicon substrate 41 is formed through with a tapered portion 42 to have an aperture 23. The aperture 23 is greater than the aperture 6 shown in Embodiment 1, and has a diameter, for example, of nearly several to several tens to of nm. The tapered portion 42 can be formed similarly by the method shown in Embodiment 1. However, a silicon oxide film is formed on a surface of the silicon substrate 41 to be formed by an aperture 23 prior to making the tapered portion 42 by etching. This silicon oxide film is left after forming the tapered portion 42 utilizing a difference in etch rate from silicon. Although the tapered portion 42 is formed in this manner, it does not penetrate through the silicon substrate 41. Accordingly, it is possible to accurately form a shape in the vicinity of the aperture 23 during subsequent forming an optical waveguide 21 and tip-sharpened electrode 22.

In this tapered portion 42, an optical waveguide 21 is formed and then a tip-sharpened electrode 22 is formed. The optical waveguide 21 is formed on the tapered portion 42 by depositing a silicon oxide film through sputtering or CVD to a thickness of approximately several micro-meters. The thickness of silicon oxide is preferred because light transmission efficiency as an optical waveguide increases with increase of the thickness.

After forming the optical waveguide 21, a metal such as aluminum is film formed by sputtering or the like, thereby forming a tip-sharpened electrode 22. Because the tip-sharpened electrode 22 is formed on a side surface of the optical waveguide 21 in a tapered form, the tip-sharpened electrode 22 at a tip can be formed in a sharp form having a tip diameter of approximately 100 nm. Then, an aperture 23 is formed by removing the silicon oxide film formed on a surface on an aperture 23 side of the silicon substrate 41.

The near-field optical head 102 thus manufactured is brought proximity to the optical disk 111, similarly to Embodiment 1. If a voltage of nearly several volts is applied to between the optical disk 111 and the tip-sharpened electrode 22, an electric field 9 can be applied only to a microscopic region on the recording medium 3.

Consequently, according to the near-field optical head according to Embodiment 2, an electric field can be applied only to the microscopic region on the optical disk 111, similarly to the near-field optical head of Embodiment 1. Because a scattering light 11 scattered upon the aperture 23 is detected by propagation through the optical waveguide 21, a reproduced signal can be increased in S/N ratio. Thus, the information recorded with extreme density on the optical disc 111 is reproduced with reliability and stability.

Also, because EL luminescence is caused only in a extremely fine region by using the tip-sharpened electrode 22, it is possible to reproduce a signal from a microscopic recorded mark 4 even if the aperture 23 is large in diameter. Thus, efficient reproduction is feasible with increased efficiency of receiving an EL light 10.

[Embodiment 3]

Figure 3A:
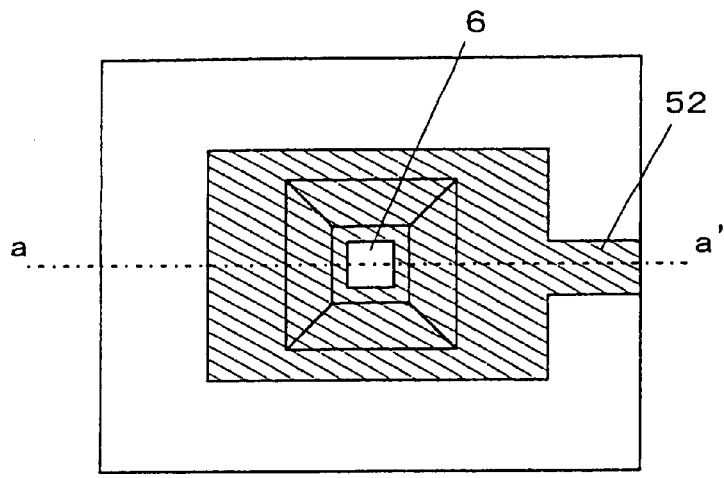
FIGS. 3A and 3B are an underside view and sectional view of one part of a near-field optical head according to Embodiment 3 of the invention.
Figure 3B:
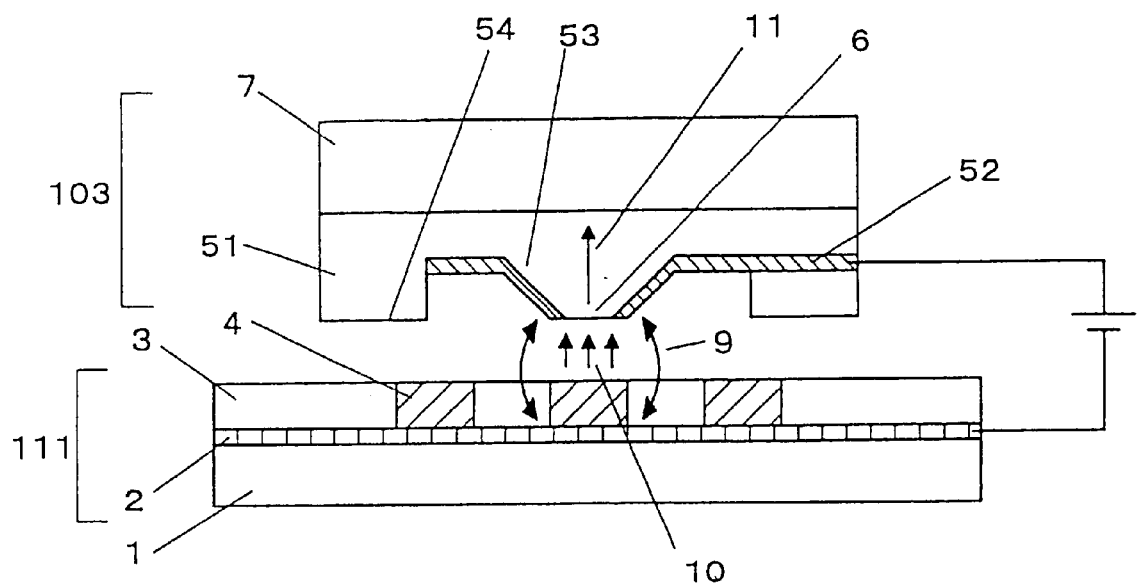

FIG. 3 shows an underside view of a near-field optical head according to Embodiment 3 and a sectional view taken on line a–a' thereof. Incidentally, the common elements to those of FIG. 1 and FIG. 2 are denoted at the same reference characters.

In FIG. 3, the optical disk 111 is the same in structure. The near-field optical head 103 is formed with a microscopic electrode 52 which is brought proximity to a surface of an optical disk 111 so that the light 10 emitted from a recorded mark 4 is received by a light detecting element 7 through an aperture 6, thereby reproducing the information recorded on the optical disk 111.

The near-field optical head 103 is formed by a light detecting element 7 and a slider 51 having an aperture 6 and a microscopic electrode 52. The slider 51 has a protrusion 53 in an inverted cone form provided in a recess of a high transmissive dielectric material such as quartz. The microscopic electrode 52 is formed by coating a periphery of the protrusion 53 with a metal coat film. The microscopic aperture 6 is formed at a tip of the protrusion 53 which is not coated with the metal film. The shape having the inverted-conical protrusion 53 in the recess can be made by forming a mask of a resist or metal film on a flat-surfaced quartz substrate in an area corresponding to the protrusion 53 by the conventional photolithography and then performing aniso-tropic or isotropic etching. At this time, the protrusion 53 at its tip will not project greater than a bottom surface 54 of the slider because of making from the flat-surfaced substrate. The metal film is preferably of a material low in resistance but high in shadability and reflectivity, e.g. aluminum or silver, and can be formed by sputtering or the like. The aperture 6 has a diameter, for example, of 50 nm. In the slider 51 thus formed, the aperture 6 is formed nearly in flush with the slider bottom surface 54. This can protect the protrusion 53 and aperture 6 from dusts or fracture due to collision. Relative to the slider 51, light detecting element 7 is arranged and bonded in a position that can efficiently receive a scattering light 11 scattered upon the aperture 6.

The near-field optical head 103 thus formed is brought proximity to an optical disk 111, similarly to Embodiments 1 and 2. If a voltage of nearly several volts is applied to between the optical disk 111 and the microscopic electrode 52, an electric field 9 can be applied only to a microscopic region on the recording medium 3. The EL light 10 caused by the electric field 9 is scattered upon the aperture 6, and detected as a scattering light 11 by the light detecting element 7.

Due to this, the aperture 6 at its periphery is shaded by the microscopic electrode 52 so that EL light 10 can be detected only through the aperture 6. Consequently, others than a reproduced signal, such as stray light, will not detected by the light detecting element 7. Thus, signal reproduction is possible with high S/N. Also, because the aperture 6 is formed on the slider 51, control is easy in a state the optical disk 111 and the aperture 6 are in proximity to each other. Furthermore, because the light detecting element 7 is bonded on the slider 51, there is no necessity of providing an optical system for detecting a propagation light scattered upon the aperture 6. Also, unnecessary is a near-field generating system for generating a near-field light. These makes it possible to make compact the structure of an information reproducing apparatus using the present embodiment.

[Embodiment 4]

Figure 4A:
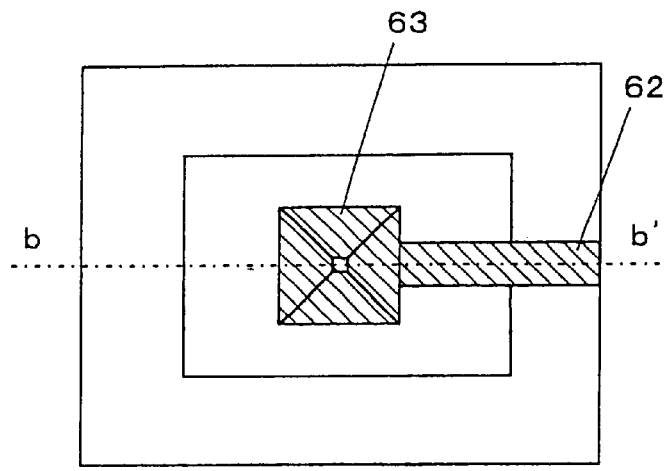
FIGS. 4A and 4B are an underside view and sectional view of one part of a near-field optical head according to Embodiment 4 of the invention.
Figure 4B:
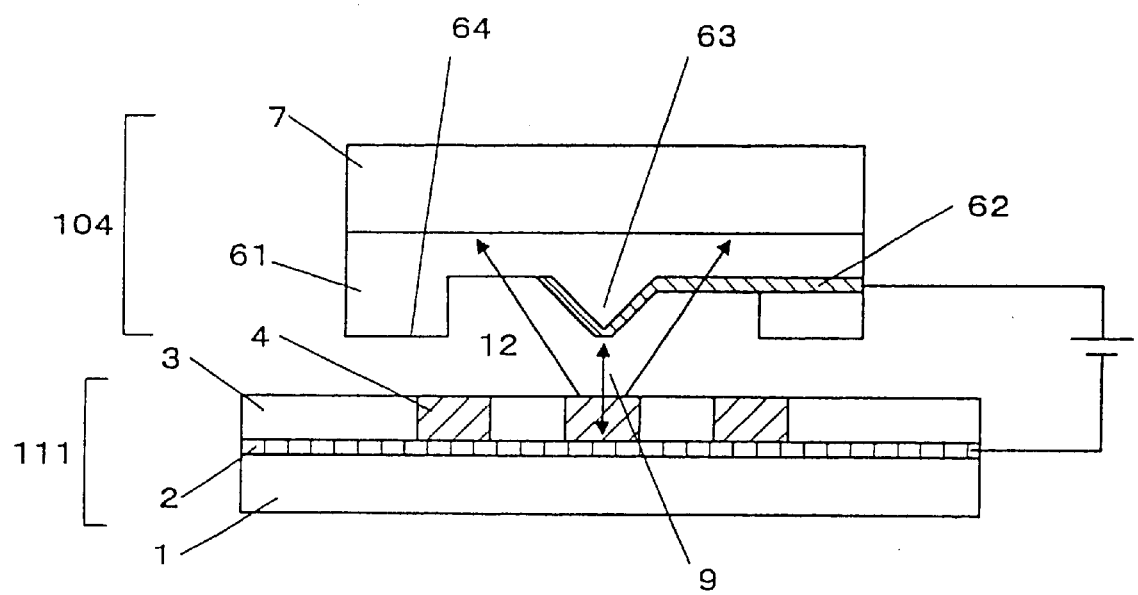

FIG. 4 shows an underside view of a near-field optical head according to Embodiment 4 and a sectional view taken on line b–b' thereof. Incidentally, the common elements to those of FIGS. 1 to 3 are denoted at the same reference characters.

In FIG. 4, the optical disk 111 is the same in structure. The near-field optical head 104 is formed with a microscopic electrode 62 which is brought proximity to a surface of an optical disk 111 so that the light emitted from a recorded mark 4 is transmitted through a slider 61 and received by a light detecting element 7, thereby reproducing the information recorded on the optical disk 111.

The near-field optical head 104 is formed by a slider 61 formed of a high transmissive dielectric material, such as quartz, and a light detecting element 7. The slider 61 has a protrusion 63 provided in a recess. A metal film is coated over a side surface and tip of the protrusion 63 to provide a head electrode 62. Due to this, there is no aperture. The slider 61 can be made similarly to the slider of Embodiment 3. Consequently, the protrusion 63 at its tip is formed in flush with a bottom surface 64 of the slider 61. Consequently, 23 the protrusion 63 and the head electrode 62 can be protected from dusts or fracture due to collision. Relative to the slider 61, the light detecting element 7 is arranged and bonded at a position that can efficiently receive an EL light 12.

The near-field optical head 104 thus formed is brought proximity to an optical disk 111, similarly to Embodiments 1 to 3. If a voltage of nearly several volts is applied to between the optical disk 111 and the head electrode 62, an electric field 9 can be applied only to a microscopic region on the recording medium 3. The most part of the EL light 12 caused by the electric field 9, if the area coated by the metal film is made small, can be transmitted through the slider 61 and then efficiently received by the light detecting element 7 without shaded by the head electrode 62.

It is therefore possible to cause luminescence only in a recorded mark 4 positioned near the tip of the protrusion 63. Thus, signal reproduction is possible with very high S/N. Also, the disk 111 and the head electrode 62 are easy to bring proximity to each other. There is no necessity of providing an optical system for detecting an EL light 12 scattered upon recorded mark 4. Also, unnecessary is a near-field generating system for creating a near-field light. Accordingly, it is possible to make compact the structure of an information reproducing apparatus using the present embodiment.

Thus, according to the near-field optical heads according to Embodiments 1 to 4 as above, there is no necessity of providing a illumination optical system for illuminating a recording medium recorded with information. Information reproduction is possible by only the near-field optical head formed with a light detecting element. It is therefore possible to make compact an information reproducing apparatus using the near-field optical head. Meanwhile, because an underside of an optical disk 111 can be effectively utilized, if the recording medium is positioned at its main or back surface up, two-sided reproduction is easily feasible with an optical disk recorded, on respective surfaces, with pits as information.

Incidentally, in Embodiments 1 to 4 as above, although the near-field optical head was formed on the slider, it may be formed on other heads. For example, it is possible to use an optical fiber probe having a microscopic aperture formed by sharpening an optical fiber and coating an periphery excepting a tip with a metal, a hollow probe having a microscopic aperture formed using a hollow glass fiber in place of an optical fiber as above, and so on.

INDUSTRIAL APPLICABILITY

As explained above, according to the present invention, information is recorded with extreme density on a recording medium that emits light by applying an electric field, and a head electrode can apply an electric field only to a microscopic region thereof thereby causing light emission. Also, a microscopic aperture is used to detect a light emitted only by the microscopic region of the recording medium. Accordingly, a reproduced signal can be increased in S/N ratio and the information recorded with extreme density on the recording medium can be reproduced with reliability and stability. Also, it is possible to realize one body structure of the head electrode and light emitting element on a slider, making compact the near-field optical head structure and not necessitating relative adjustment between constituent components.

Also, according to the invention, information is recorded with extreme density on a recording medium that emits light by applying an electric field, and an electric field can be applied only to a microscopic region thereof thereby causing light emission. Also, there is no necessity of a propagation light for causing a near-field light, and moreover a microscopic aperture is used to detect a light emitted only by the microscopic region of the recording medium. Accordingly, a reproduced signal can be increased in S/N ratio and the information recorded with extreme density on the recording medium can be reproduced with reliability and stability. Also, it is possible to realize one body structure of the microscopic electrode and light emitting element on a slider, making compact the near-field optical head structure and not necessitating relative adjustment between constituent components.

Also, according to the invention, information is recorded with extreme density on a recording medium that emits light by applying an electric field, and a tip sharpened electrode can apply an electric field only to a microscopic region thereof thereby causing light emission. Also, an optical waveguide formed in the microscopic aperture detects a light emitted only by the microscopic region. Accordingly, a reproduced signal can be increased in S/N ratio and the information recorded with extreme density on the recording medium can be reproduced with reliability and stability. Also, it is possible to realize one body structure of the tip sharpened electrode and light emitting element on a slider, making compact the near-field optical head structure and not necessitating relative adjustment between constituent components.

Also, according to the invention, information is recorded with extreme density on a recording medium that emits light by applying an electric field, and a microscopic electrode can apply an electric field only to a microscopic region thereof thereby causing light emission. Also, a microscopic aperture detects a light emitted only by the microscopic region. Accordingly, a reproduced signal can be increased in S/N ratio and the information recorded with extreme density on the recording medium can be reproduced with reliability and stability. Also, it is possible to realize one body structure of the microscopic electrode and light emitting element on a slider, making compact the near-field optical head structure and not necessitating relative adjustment between constituent components.

Also, according to the invention, information is recorded with extreme density on a recording medium that emits light by applying an electric field, and a tip sharpened electrode can apply an electric field only to a microscopic region thereby causing light emission. Accordingly, a reproduced signal can be increased in S/N ratio and the information recorded with extreme density on the recording medium can be reproduced with reliability and stability. Also, it is possible to realize one body structure of the microscopic electrode and light emitting element on a slider, making compact the near-field optical head structure and not necessitating relative adjustment between constituent components.

Also, according to the invention, information is recorded with extreme density on a recording medium that emits light by applying an electric field, and a tip sharpened head electrode can apply an electric field only to a microscopic region thereof thereby causing light emission. Accordingly, a reproduced signal can be increased in S/N ratio. It is possible to provide a reproducing method which can reproduce information recorded with extreme density on the recording medium with reliability and stability.

Also, according to the invention, information is recorded with extreme density on a recording medium that emits light by applying an electric field, and a head electrode can apply an electric field only to a microscopic region thereof thereby causing light emission. Also, a microscopic aperture detects a light emitted only by the microscopic region. Accordingly, a reproduced signal can be increased in S/N ratio. It is possible to provide a reproducing method which can reproduce information recorded with extreme density on the recording medium with reliability and stability.

What is claimed is:

1. A near-field optical head for reproducing information on a recording medium that is formed on an electrode and emits light by applying an electric field, the near-field optical head comprising:
    a slider having at least one hole formed through in an inverted cone form such that a summit thereof is rendered as a microscopic aperture and a head electrode opposed to the electrode and provided in the inverted cone formed hole;
    a light detecting element arranged in the slider on an opposite surface to a surface formed with the microscopic aperture in a manner corresponding to the microscopic aperture;
    the microscopic aperture and the recording medium being brought into proximity; and
    a voltage being applied to between the electrode and the head electrode.

2. A near-field optical head for reproducing information on a recording medium that is formed on an electrode and emits light by applying an electric field, the near-field optical head comprising:
    a slider having at least one hole formed through in an inverted cone form such that a summit thereof is rendered as a microscopic aperture;
    a microscopic electrode formed on a side surface of the inverted cone formed hole;
    a light detecting element arranged in the slider on an opposite surface to a surface formed with the microscopic aperture in a manner corresponding to the microscopic aperture;
    the microscopic aperture and the recording medium being brought into proximity; and
    a voltage being applied to between the electrode and the microscopic electrode.

3. A near-field optical head for reproducing information on a recording medium that is formed on an electrode and emits light by applying an electric field, the near-field optical head comprising:
    a slider having at least one hole formed through in an inverted cone form such that a summit thereof is rendered as a microscopic aperture;
    an optical waveguide formed on a side surface of the inverted cone formed hole;
    a tip sharpened electrode formed inside of the inverted cone formed hole and having a tip directed to the microscopic aperture;
    a light detecting element arranged in the slider on an opposite surface to a surface formed with the microscopic aperture in a manner corresponding to the optical waveguide;
    the microscopic aperture and the recording medium being brought into proximity; and
    a voltage being applied to between the electrode and the tip sharpened electrode.

4. A near-field optical head for reproducing information on a recording medium that is formed on an electrode and emits light by applying an electric field, the near-field optical head comprising:
    a slider having at least one protrusion formed in an inverted cone form such that a summit thereof is opposed to the recording medium;
    a microscopic electrode formed on a side surface of the protrusion such that a microscopic aperture is formed at a tip;
    a light detecting element arranged in the slider on an opposite surface to a surface formed with the protrusion in a manner corresponding to the protrusion;
    the protrusion and the recording medium being brought into proximity; and
    a voltage being applied to between the electrode and the microscopic electrode.

5. A near-field optical head reproducing information on a recording medium that is formed on an electrode and emits light by applying an electric field, the near-field optical head comprising:
    a slider having at least one protrusion formed in an inverted cone form such that a summit thereof is opposed to the recording medium;
    a microscopic electrode formed at a tip of the inverted cone form;
    a light detecting element arranged in the slider on an opposite surface to a surface formed with the protrusion in a manner corresponding to the protrusion;
    the protrusion and the recording medium being brought into proximity; and
    a voltage being applied to between the electrode and the microscopic electrode.

6. A reproducing method for reproducing information on a recording medium that is formed on an electrode and emits light by applying an electric field, the reproducing method comprising:

using a near-field optical head having a slider opposed to the electrode and formed with at least one tip sharpened head electrode, and a light detecting element arranged in the slider in a manner corresponding to the head electrode;

bringing the protrusion and the recording medium into proximity;

applying a voltage to between the electrode and the head electrode to cause the recording medium to emit light; and detecting a light due to light emission by the light detecting element.

7. A reproducing method for reproducing information on a recording medium that is formed on an electrode and emits light by applying an electric field, the reproducing method comprising:

using a near-field optical head having a slider formed with at least one microscopic aperture and having a head electrode opposed to the electrode and provided in the vicinity of the microscopic aperture, and a light detecting element arranged in the slider on a opposite surface to a surface formed with the microscopic aperture in a manner corresponding to the microscopic aperture;

bringing the protrusion and the recording medium into proximity;

applying a voltage to between the electrode and the head electrode to cause the recording medium to emit light; and detecting a light due to light emission by the light detecting element through the microscopic aperture.

* * * * *